(12) United States Patent
Quinno et al.

(10) Patent No.: US 7,090,186 B2
(45) Date of Patent: Aug. 15, 2006

(54) EXTENDABLE AUTOMOTIVE VIDEO DISPLAY CONSOLE ASSEMBLY

(75) Inventors: James Quinno, Saline, MI (US); Jeff Donovan, St. Clair Shores, MI (US); Brian Sutcliffe, Commerce Township, MI (US); James B. Cook, Detroit, MI (US)

(73) Assignee: Lear Corporation, Southfield, MI (US)

( * ) Notice: Subject to any disclaimer, the term of this patent is extended or adjusted under 35 U.S.C. 154(b) by 608 days.

(21) Appl. No.: 10/248,421

(22) Filed: Jan. 17, 2003

(65) Prior Publication Data

US 2004/0141095 A1 Jul. 22, 2004

(51) Int. Cl.
*A47H 1/10* (2006.01)

(52) U.S. Cl. ............... 248/324; 248/327; 248/323; 248/917; 248/918; 248/920; 248/923; 345/87; 345/825; 345/831; 348/837; 296/24.34; 312/7.2

(58) Field of Classification Search ............... 248/327, 248/323, 317, 324, 237, 917, 918, 919, 920, 248/923; 296/24.34; 348/837, 825, 831; 361/681; 345/87
See application file for complete search history.

(56) References Cited

U.S. PATENT DOCUMENTS 5,161,028 A * 11/1992 Kawata et al. ............ 348/837
5,467,106 A * 11/1995 Salomon .................... 345/87
5,847,685 A * 12/1998 Otsuki ....................... 345/87
6,361,012 B1 * 3/2002 Chang ....................... 248/324
6,633,347 B1 * 10/2003 Kitazawa ................... 348/837
6,695,376 B1 * 2/2004 Hirano ...................... 296/37.7
6,724,317 B1 * 4/2004 Kitano et al. ............ 340/691.1
2004/0141095 A1 * 7/2004 Quinno et al. ............ 348/837

* cited by examiner

Primary Examiner—Richard E. Chilcot, Jr.
Assistant Examiner—Todd M. Epps
(74) Attorney, Agent, or Firm—Earl J. LaFontaine

(57) ABSTRACT

An automotive video display console assembly 18 for installation in a vehicle 10 is provided. The automotive video display console assembly 18 includes a console housing 20. The automotive video display console assembly 18 further includes a horizontal support element 34 including a first end 36 engaging the console housing 20 and a second end 38. The second end 38 is movable between a support stowage position 42 and a horizontally extended position 44 horizontally distanced from the support stowage position 42. A video display element 26 is pivotably mounted to the second end 38 such that the video display 26 can be moved between a display stowage position 28 and a display active position 30 when the second end 38 is in the support stowage position 42. The video display 26 can be further moved to a display extended position 32 when the second end 38 is positioned in the horizontally extended position 44.

20 Claims, 4 Drawing Sheets

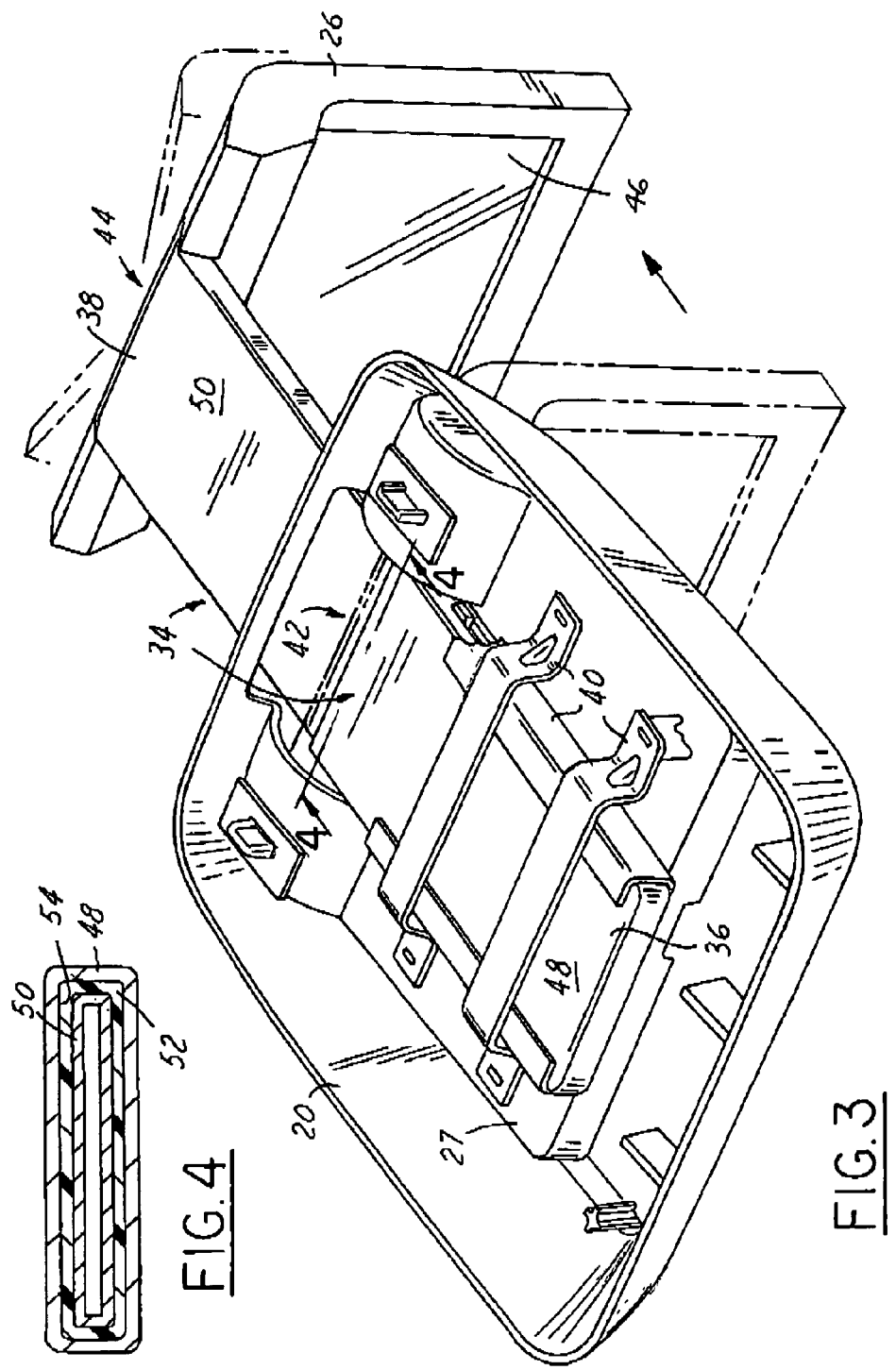

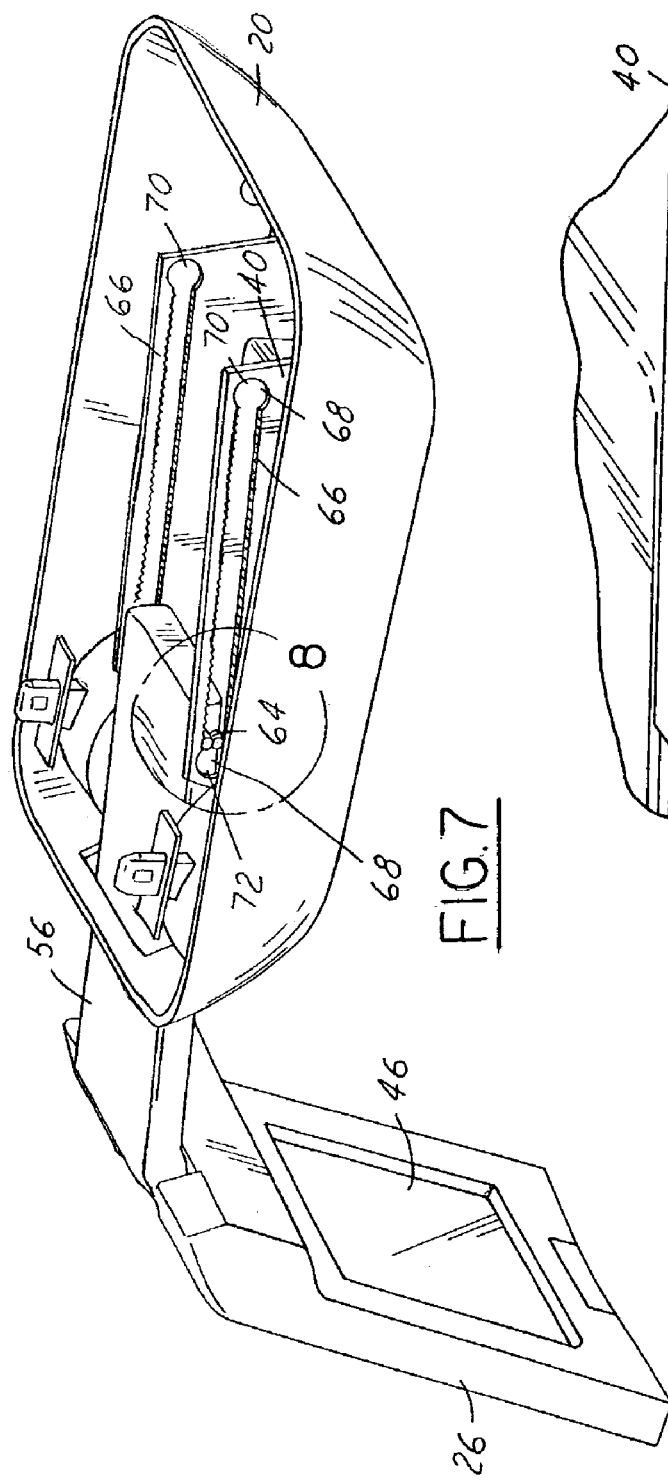
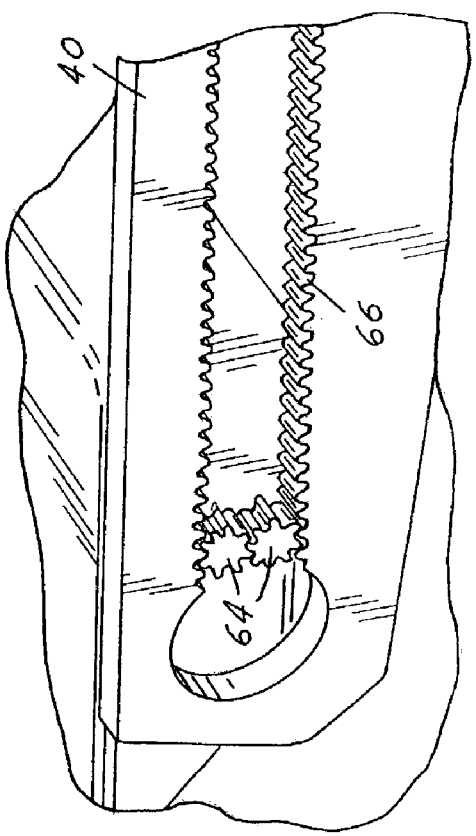
FIG.7
FIG.8

EXTENDABLE AUTOMOTIVE VIDEO DISPLAY CONSOLE ASSEMBLY

BACKGROUND OF INVENTION

The present invention relates generally to an automotive video display console assembly and more specifically to an automotive video display console assembly with extendable display features.

Modern automotive vehicle designs incorporate an ever-increasing array of amenities and features. Where once the interior of a vehicle was largely utilitarian, it is presently being filled with a proliferation of multi-media devices intended to provide passengers with both information as well as entertainment. Central to many of these devices, such as maps, internet access, movies, and video games, is the use of a video display. The video display can interact with these features, as well as a wide variety of other features, to provide a central multi-media access point for passengers.

Issues arise, however, as a video display must coexist with a plurality of other features within the often space-restricted environment of the automotive interior. Video displays often represent non-insubstantially sized components that must be mounted within the interior without interfering with other automotive components. Furthermore, the nature of video displays is such that they must be positioned a comfortable distance from the viewer to allow easy viewing. If positioned too far from a viewer, a video display may be unreadable or may result in eye strain. Positioned too close to a viewer and a video display may equally result in viewer discomfort. Adding to these concerns, passengers do not come in a universal size or proportion and therefore present a variety of preferable positions for the video display.

Modern automotive video displays, however, provide little adjustment to accommodate these varying scenarios. Adjustment of the video screen, when present, commonly represents the ability to angle or rotate the screen. These adjustment features to not accommodate the concept of comfortable viewing distance. Furthermore, when the video display is mounted on the headliner, features such as sun-roofs often effect its position. The mounting base for the video display, in these scenarios, can be positioned rearward in a vehicle to the point that the screen is positioned too close to rear passengers for comfortable viewing without strain. Present video display configurations place installation at odds with features such as sun roofs and can force customers to choose between equally desirable luxury options.

It would therefore be highly desirable to have an automotive video display console assembly with improved adjustment features that accommodated comfortable viewing distance adjustment. It would further be highly desirable to develop an automotive video display console assembly with expanded placement options within the automotive interior such that it is easily integrated with existing automotive options.

SUMMARY OF INVENTION

It is therefore an object to the present invention to provide an automotive video display console assembly with improved adjustment features. It is further object to the present invention to provide an automotive video display console assembly with expanded placement capabilities.

In accordance with the objects of the present invention an automotive video display console assembly for installation in a vehicle is provided. The automotive video display console assembly includes a console housing. The automotive video display console further includes a horizontal support element including a first end engaging the console housing and a second end. The second end is movable between a support stowage position and a horizontally extended position horizontally distanced from the support stowage position. A video display element is pivotably mounted to the second end such that the video display can be moved between a display stowage position and a display active position when the second end is in the support stowage position. The video display can be further moved to a display extended position when the second end is positioned in the horizontally extended position.

Other objects and features of the present invention will become apparent when viewed in light of the detailed description and preferred embodiment when taken in conjunction with the attached drawings and claims.

BRIEF DESCRIPTION OF DRAWINGS

FIG. 3 is an illustration of the automotive video display console assembly illustrated in FIG. 2;

FIG. 4 is a cross-sectional illustration of a portion of the automotive video display console assembly illustrated in FIG. 3, the cross-section taken along the line 4—4 in the direction of the arrows;

FIG. 7 is an illustration of an alternate embodiment of an automotive video display console assembly in accordance with the present invention; and FIG. 8 is a detailed illustration of a portion of the automotive video display console assembly shown in FIG. 7.

DETAILED DESCRIPTION

Figure 1:
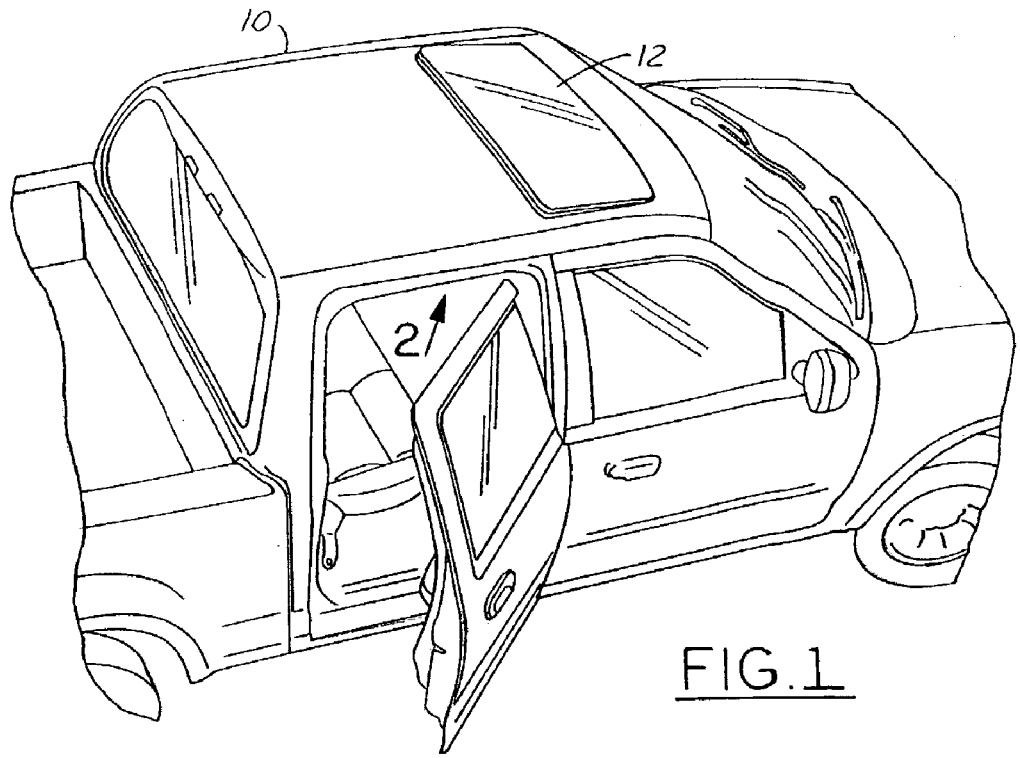
FIG. 1 is illustration of an automotive vehicle for use with the automotive video display console assembly in accordance with the present invention.

Referring now to FIG. 1, which is an illustration of an automotive vehicle 10 for use with the present invention. It should be understood that the style, format, and configuration of the illustrated automotive vehicle 10 are illustrative only and are not intended as limitations on the present invention. Modern convenience packages often make optimum placement and usage of multi-media devices difficult. Convenience features 12 such as the illustrated sunroof 12 make positioning difficult for installation as well as viewing. Often such installation, in light of features such as the sunroof 12, must be placed in less than optimum locations such as on the header 14. Placement of multi-media devices in these locations can make viewing from the rear seating 16 positions difficult. Often a combination of improper viewing angle or insufficient viewing distance can make use and enjoyment of the multi-media device sub-optimum. It should be understood that although a single incidence of limited multi-media placement has been described in detail, a variety of placement scenarios are contemplated wherein conventional designs do not accommodate desirable viewing distance of a multi-media component.

The present invention addresses these concerns by providing an automotive video display console assembly 18 with improved adjustment features. The automotive video display console assembly 18 is illustrated mounted to the header 14 behind the sunroof 12. The automotive video display console assembly 18, however, can be installed in a variety of location throughout the vehicle. The automotive video display console assembly 18 includes a console housing 20. The console housing 20 can include a variety of control elements 22 (such as a dvd-player, video game console, and corresponding control buttons) in addition to incorporating traditional automotive features such as a dome light 24 or reading lights. Central to the automotive video display console assembly 18 is a video display 26 with improved adjustment features.

Figure 2:
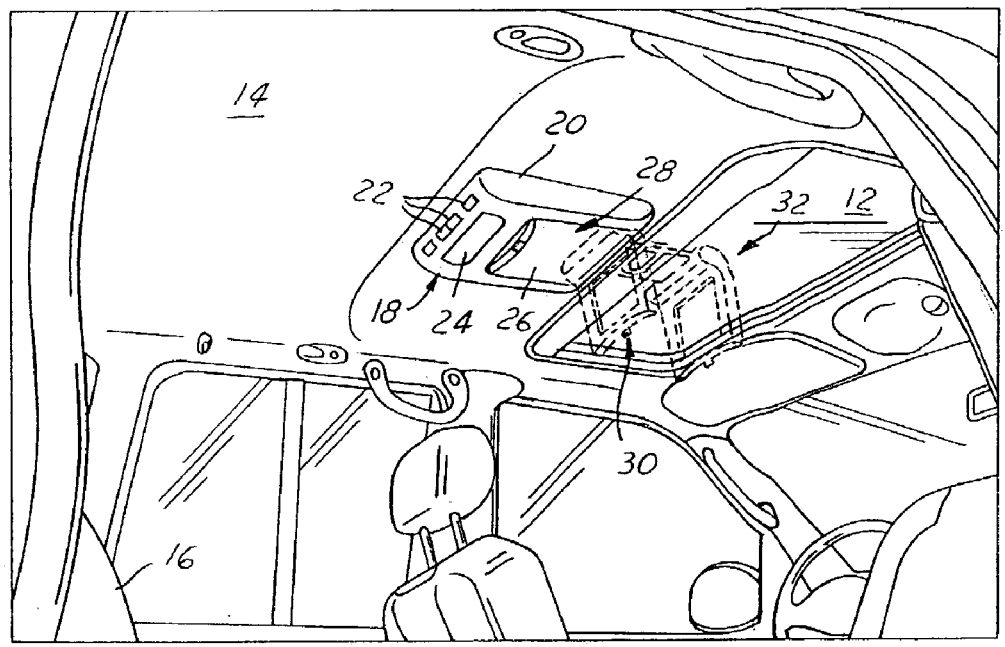
FIG. 2 is illustration of an embodiment of the automotive video display console assembly in accordance with the present invention, the automotive video display console assembly illustrated installed in the automotive vehicle of FIG. 1.

The video display 26 may be formed in a wide variety of particular embodiments including, but not limited to, liquid crystal displays and plasma displays. The video display 26 is movable between a display stowage position 28 and a display active position 30. In the display stowage position 28, the video display 26 is preferably flush with the console housing 20 such that line-of-sight through the vehicle 10 is not impeded. In this light, the console housing 20 may include a recess 27 (see FIG. 3) formulated to receive the video display 26 when in the display stowage position 28. The video display 26, however, is also rotatable into the display active position 30 such that it can be adjusted and viewed by passengers. As mentioned, however, placement of the console housing 20 within the vehicle 10 interior can make viewing from the display active position 30 sub-optimum. The present invention, therefore, further includes the ability to move the display into a display extended position 32 wherein the video display 26 is extended in a horizontal direction from the console housing 20 in order to improve or adjust the viewing distance for passengers. In the scenario illustrated in FIG. 2, the video display 26 can be moved forward in the vehicle 10 in order to improve the viewing distance of passengers in the rear seats 16.

Although it is contemplated the ability to move the video display 26 into the display extended position 32 may be accomplished in a variety of fashions, one embodiment is illustrated in FIG. 3. The automotive video display console assembly 18 includes a horizontal support element 34 in communication with the console housing 20. The horizontal support element 34 includes a first end 36 and a second end 38. The first end 36 is mounted to the console housing 20. Although the first end 36 can be mounted to the console housing 20 in a variety of fashions, one embodiment contemplates the use of a bracket assembly 40 to which the first end 36 may be movably engaged. The second end 38 is movable between a support stowage position 42 and a horizontally extended position 44 horizontally distanced from the support stowage position 42. The video display 26 is pivorably attached to the second end 38 such that the video display 26 can be moved from the display active position 30 to the display extended position 32. The video display 26 is pivorably attached such that the screen 46 can be additionally adjusted into a variety of viewing angles.

Although a variety of embodiments of the horizontal support element 34 are contemplated, one embodiment contemplates the horizontal support element 34 including a base shell 48 and at least one telescoping member 50. The base shell 48 is preferably fixedly mounted to the console housing 20 via the bracket assembly 40. The telescoping member 50 is positioned substantially within the base shell 48 when the second end 38 is in the support stowage position 42. When the second end 38 is moved into the horizontally extended position 44, the telescoping member 50 moves out to be horizontally distanced from the support stowage position 42. This allows the viewing distance of the video display 26 to be adjusted by users after installation. It is contemplated that a friction liner 52, such as delrin (acetal), may be positioned between the base shell 48 and the telescoping member 50 in order to produce smooth, reduced friction motion when adjusting the horizontal position of the video display 26 (see FIG. 4). The friction liner 52 is preferably mounted to the inner surface 54 of the base shell 48.

Figure 5:
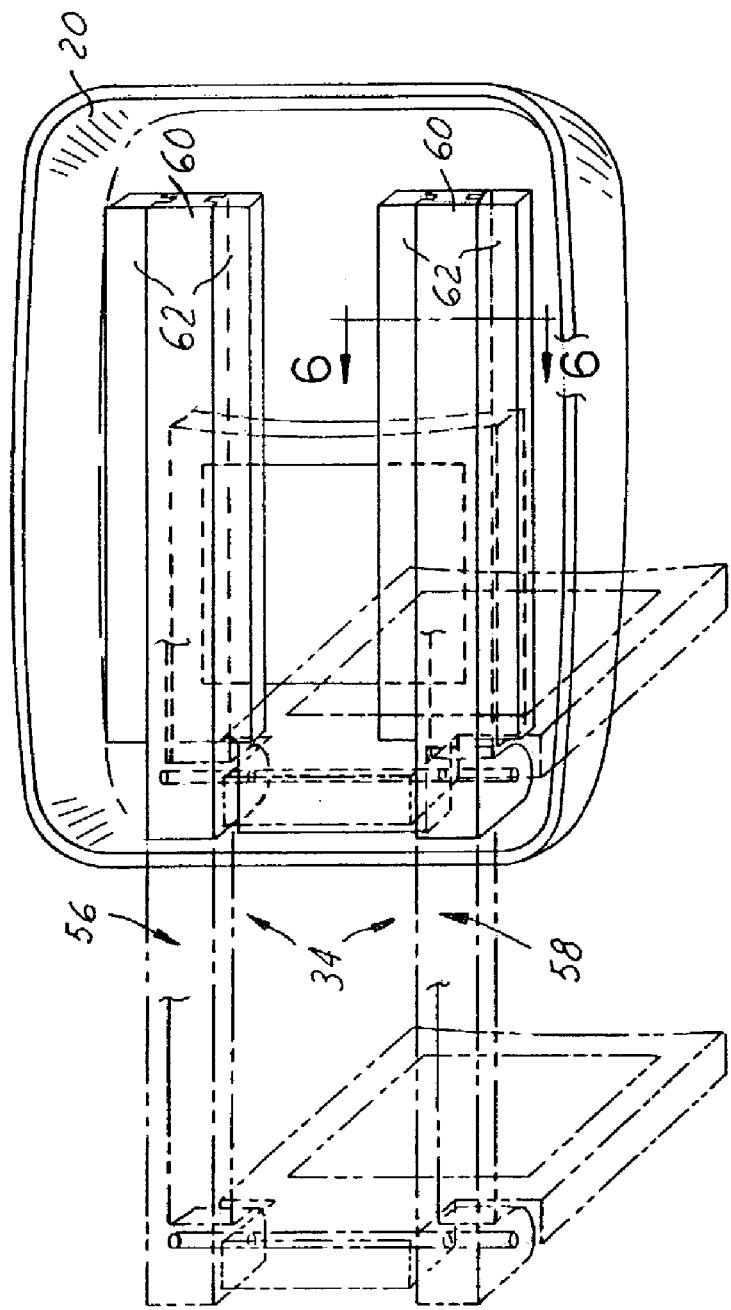
FIG. 5 is an illustration of an alternate embodiment of an automotive video display console assembly in accordance with the present invention.
Figure 6:
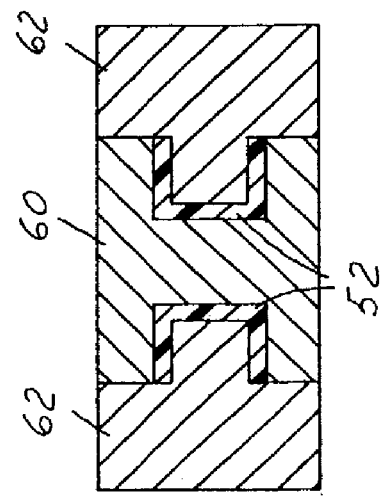
FIG. 6 is a cross-sectional illustration of a portion of the automotive video display console assembly illustrated in FIG. 5, the cross-section taken along the line 6—6 in the direction of the arrows.

Although a single horizontal support element 34 may be utilized to support the video display 26, in alternate embodiments such as the one illustrated in FIG. 5 multiple horizontal support elements 34 may be utilized. In this embodiment the horizontal support element 34 includes a first horizontal support element 56 and a second horizontal support element 58. Similarly, the configuration of the base shell 48 and telescoping member(s) 50 can be modified. The base shell 48 and telescoping member 50 can be formed using an I-channel member 60 supported by two t-members 62 engaging the I-channel member 60 (see FIG. 6). A friction liner 52 may be positioned between the I-channel member 60 and the t-members 62 to improve easy of motion.

Although the horizontal support element 56 has thus far been described in terms of a telescoping arrangement, it should be understood that additional embodiments are contemplated that allow the second end 38 to be moved into the horizontally extended position 44. One such embodiment is illustrated in FIGS. 7 and 8. This embodiment illustrates a single piece horizontal support element 56. The first end 36 is slidably mounted to the console housing 20 by way of the mounting bracket assembly 40. A plurality of gear elements 64 mounted to the first end 36 engage a gear path 66 formed in the mounting bracket assembly 40 such that the second end 38 can be pulled horizontally outwards from the support stowage position 42 to the horizontally extended position 44. A plurality of detents 68 may be utilized, such as the close detent 70 and open detent 72, such that the user is given a tactile feel when the range of motion of the horizontal support element 56 has been reached.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. An automotive video display console assembly comprising:
    a console housing;
    a horizontal support element including a first end and a second end, said first end mounted to said console housing, said second end movable between a support stowage position and a horizontally extended position, said horizontally extended position horizontally distanced from said support stowage position, said second end positioned exterior to and remote from said console housing when in said horizontally extended position; and a video display element pivotably mounted to said second end, said video display is movable between a display stowage position and a display active position when said second end is in said support stowage position, said video display movable to a display extended position when said second end is positioned in said horizontally extended position, said display extended position exterior to and remote from said console housing.

2. An automotive video display console assembly as described in claim 1, wherein said video display element comprises a liquid-crystal display element.

3. An automotive video display console assembly as described in claim 1, further comprising:
a bracket assembly mounting said horizontal support element to said console housing.

4. An automotive video display console assembly as described in claim 3, wherein said first end is rigidly mounted to said bracket assembly.

5. An automotive video display console assembly as described in claim 1, wherein said horizontal support element comprises:
a base shell rigidly mounted in communication with said console housing: and
a telescoping member slidably engaging said base shell member.

6. An automotive video display console assembly as described in claim 5, further comprising:
a frictional liner positioned between said base shell and said telescoping member.

7. An automotive video display console assembly comprising:
a console housing;
a horizontal support element including a first end and a second end, said first end mounted to said console housing, said second end movable between a support stowage position and a horizontally extended position, said horizontally extended position horizontally distanced from said support stowage position;
a video display element pivotably mounted to said second end, said video display is movable between a display stowage position and a display active position when said second end is in said support stowage Position, said video display movable to a display extended position when said second end is positioned in said horizontally extended position;
an I-channel member in communication with said video display clement; and
a plurality of t-members slidably engaging said I-channel member.

8. An automotive video display console assembly as described in claim 1, wherein said horizontal support element comprises a first horizontal support element and a second horizontal support element, said first horizontal support element positioned remotely from said second horizontal support element.

9. An automotive video display console assembly as described in claim 3, wherein said first end movably engages said bracket assembly.

10. An automotive video display console assembly as described in claim 1, wherein said first end remains at a fixed distance from said second end.

11. An automotive video display console assembly comprising:
a console housing:
a horizontal support element including a first end and a second end, said first end mounted to said console housing, said second end movable between a support stowage position and a horizontally extended position, said horizontally extended position horizontally distanced from said support stowage position:
a video display element pivotably mounted to said second end, said video display is movable between a display stowage position and a display active position when said second end is in said support stowage position, said video display movable to a display extended position when said second end is positioned in said horizontally extended position;
a bracket assembly mounting said horizontal support element to said console housing;
a gear assembly rotatably mounted to said horizontal support element; and
a gear path formed in said bracket assembly, said gear assembly engaging said gear path.

12. An automotive video display console assembly as described in claim 11, further comprising:
at least one detent formed in said gear path.

13. An automotive video display console assembly comprising:
a console housing;
a bracket assembly mounted to said console housing;
a horizontal support element including a first end and a second end, said first end mounted to said bracket assembly, said second end movable between a support stowage position and a horizontally extended position, said horizontally extended position horizontally distanced from said support stowage position;
a video display element pivotably mounted to said second end, said video display is movable between a display stowage position and a display active position when said second end is in said support stowage position, said video display movable to a display extended position when said second end is positioned in said horizontally extended positions;
an I-channel member in communication with said video display element; and
a plurality of t-members slidably engaging said I-channel member.

14. An automotive video display console assembly as described in claim 13, wherein said first end is rigidly mounted to said bracket assembly.

15. An automotive video display console assembly as described in claim 13, wherein said horizontal support element comprises:
a base shell rigidly mounted in communication with said bracket assembly; and
a telescoping member slidably engaging said base shell member.

16. An automotive video display console assembly as described in claim 15, further comprising:
a frictional liner positioned between said base shell and said telescoping member.

17. An automotive video display console assembly as described in claim 13, wherein said first end movably engages said bracket assembly.

18. An automotive video display console assembly as described in claim 13, wherein horizontal support element is a single element such that said first end remains at a fixed distance from said second end.

19. An automotive video display console assembly comprising:
a console housing:
a bracket assembly mounted to said console housing;

a horizontal support element including a first end and a second end, said first end mounted to said bracket assembly said second end movable between a support stowage position and a horizontally extended position, said horizontally extended position horizontally distanced from said support stowage position;

a video display element pivotably mounted to said second end, said video display is movable between a display stowage position and a display active position when said second end is in said support stowage position, said video display movable to a display extended position when said second end is positioned in said horizontally extended position;

a gear assembly rotatably mounted to said horizontal support element; and a gear path formed in said bracket assembly, said gear assembly engaging said gear path.

20. An automotive video display console assembly as described in claim 19, further comprising:

at least one detent formed in said gear path.

* * * * *